United States Patent [19]

Ishii et al.

[11] Patent Number: 5,505,176
[45] Date of Patent: Apr. 9, 1996

[54] VALVE SEATING NOISE DISCRIMINATING SYSTEM FOR ENGINE WITH VARIABLE VALVE OPERATING SYSTEM

[75] Inventors: Dairoku Ishii, Kyoto; Toshio Iwata, Himeji, both of Japan

[73] Assignee: Mitsubishi Jidosha Kogyo Kabushiki Kaisha, Tokyo, Japan

[21] Appl. No.: 256,347

[22] PCT Filed: Nov. 15, 1993

[86] PCT No.: PCT/JP93/01667

§ 371 Date: Oct. 6, 1994

§ 102(e) Date: Oct. 6, 1994

[87] PCT Pub. No.: WO94/11632

PCT Pub. Date: May 26, 1994

[30] Foreign Application Priority Data

Nov. 16, 1992 [JP] Japan ................................. 4-305554

[51] Int. Cl.$^6$ ........................................................ F02P 5/15
[52] U.S. Cl. ............................................ 123/425; 73/35.03
[58] Field of Search ................................. 123/425, 435; 73/35

[56] References Cited

U.S. PATENT DOCUMENTS

| 4,476,709 | 10/1984 | Hattori et al. ............................ 73/35 |
| 4,640,250 | 2/1987 | Hosaka et al. ....................... 123/425 |
| 5,136,998 | 8/1992 | Deutsch ............................. 123/425 X |

FOREIGN PATENT DOCUMENTS 61-18838  1/1986  Japan .
2-102344  4/1990  Japan .
2-275043  11/1990  Japan .
3-19448   2/1991  Japan .

Primary Examiner—Tony M. Argenbright

[57] ABSTRACT

A valve seating noise discriminating system discriminates valve seating noises caused by valves of a valve system in an engine from noises caused by knocking. Ignition timing can be prevented from being erroneously retarded due to the valve seating noises. A variable valve operation control unit A1 selects one of a plurality of valve operation modes. A knocking detecting unit A2 detects vibrations equivalent to knocking and issues a knocking present signal K. A valve seating noise discriminating unit A3 discriminates a valve seating noise when a level of a first knocking present signal K meets a predetermined requirement. When it is in a standby state, a cylinder number storage A4 stores a cylinder number associated with the first knocking present signal K when the valve seating noise discriminating units discriminates the valve seating noise. A knocking determining unit A5 determines the presence of actual knocking when a second knocking present signal K is issued for a cylinder which differs from the cylinder associated with the first knocking present signal. Then, an ignition timing calculating unit A6 corrects target ignition timing $\theta_{adv}$ in response to the knocking present signal so as to retard it, and provides corrected target ignition timing to igniter driving circuits of an engine E. A control unit A7 returns the cylinder number discriminating unit A4 to the standby state after a current valve operating mode is switched over.

11 Claims, 8 Drawing Sheets

VALVE SEATING NOISE DISCRIMINATING SYSTEM FOR ENGINE WITH VARIABLE VALVE OPERATING SYSTEM

FIELD OF THE INVENTION

This invention relates to a valve seating noise discriminating system for an engine in which a valve system includes a variable valve operating mechanism for selectively changing statuses of intake and exhaust valves under the control of a control unit so as to establish a selected target operation mode of the engine. The valve seating noise discriminating system serves to prevent engine ignition timing from being affected by valve seating noises.

DESCRIPTION OF THE RELATED ART

There are known engines which include: a variable valve operating mechanism for selectively operating low or high speed cams at appropriate timing so as to increase engine output depending upon engine operating conditions; or a variable valve operating mechanism for selectively operating low or high speed cams, operating valves by the selected cams, and allowing a partial cylinder operation mode by interrupting supply of intake air and fuel to only a part of cylinders, thereby increasing engine output and reducing fuel consumption.

A control unit for such variable valve operating mechanisms sets various operation modes according to engine operating condition information. For instance, some of the cylinders are disconnected in a partial cylinder operation mode by de-activating intake and exhaust valves of such cylinders and interrupting fuel supply thereto. When the engine is taken out of the partial cylinder operation mode, the disconnected cylinders become active, meaning that their intake and exhaust valves are activated and fuel is supplied thereto. Further, in a full cylinder operation mode (with all the cylinders activated) at a low engine speed, low speed cams are used to operate the intake and exhaust valves so as to increase volume efficiency and output of the engine. Conversely, high speed cams are used to operate the valves in the full cylinder operation mode at a high engine speed, thereby increasing the volume efficiency and the output of the engine.

Generally, a control system of an internal combustion engine periodically receives various pieces of engine operating information from sensors, calculates values for controlling the engine operation according to the received operational data, activates actuators on the basis of outputs corresponding to the calculated values, and controls various mechanisms accordingly.

In the foregoing internal combustion engine, a quantity of intake air (A/N) to be introduced into combustion chambers of the engine is regulated according to the throttle valve opening. Fuel is supplied into the combustion chambers according to the intake air quantity commensurate with a current engine speed and throttle opening. Then, ignition is controlled to be performed at the timing determined depending upon the intake air quantity and engine speed.

There is a so-called speed-density type engine, in which an amount by which to advance the ignition timing is calculated on the basis of a pressure in an intake air pipe. In the speed-density type engine, it is not necessary to detect the intake air quantity by using an air flow sensor or the like, but it is sufficient simply to connect a pipe for introducing the pressure in the intake air pipe to an air pressure sensor. This configuration relatively relieves an air intake system from an intake air resistance, and is advantageous in reducing the cost of the sensor.

With the speed-density type engine, ignition timing is calculated on the basis of reference ignition timing $\theta_b$ prepared in map form. The reference ignition timing $\theta_b$ corresponds to an engine speed Ne and an intake air flow pressure Pb which is used in place of an intake air quantity A/N. Actual reference ignition timing $\theta_b$ is calculated on the basis of a current engine speed Ne and the intake air pressure Pb, and is corrected according to an amount $\theta_k$ to retard the ignition timing so as to derive target ignition timing $\theta_{adv}$.

To calculate the angle of retard $\theta_k$, a knocking sensor detects vibrations which are generated when the engine is pinking. Specifically, an electronic control unit calculates the angle of retard $\theta_k$ on the basis of a level of a knocking present signal from the knocking sensor. In this case, the vibrations may accompany other vibrations in addition to those caused by the pinking. A valve seating noise discriminating system has been proposed to discriminate the second mentioned vibrations.

For instance, when a variable valve operating mechanism changes over from the low engine speed mode to the high engine speed mode, high speed cams which have a longer lift than low speed cams are prone to produce relatively loud valve seating noises. Generally, it is considered that valve seating noises frequently occur in the high engine speed mode.

The valve seating noise discriminating system is designed with attention paid to the fact that valve seating noises frequently occur in the same cylinder. Specifically, when a first knocking present signal is issued from the knocking sensor and is determined to have a level in the predetermined range, the valve seating noise discriminating unit assumes that a valve seating noise is present. Noting a specific cylinder which is generating the valve seating noise, the valve seating noise discriminating unit immediately actuates a timer for counting a valve seating noise detecting period Ts. When detecting the next knocking present signal which has the level in the predetermined range and is generated in the same cylinder before the timer completes counting the valve seating noise detecting period Ts, the valve seating noise discriminating unit determines that the knocking present signal represents an actual valve seating noise, and cancels retarding of the ignition timing in response to the knocking.

The foregoing valve seating noise discriminating unit can discriminate, from the knocking, the valve seating noises which are frequently recurrent in the same cylinder. Therefore, it is possible to prevent a problem in which the ignition timing is retarded and an engine output is reduced when a valve seating noise is regarded as knocking at the time of change-over from the low engine speed mode to the high engine speed mode.

The valve seating noise discriminating unit notes a cylinder for which a first knocking present signal is generated, and cancels the retarding of the ignition timing when a second knocking present signal having the level in the predetermined range is issued for the same cylinder before the valve seating noise detecting period Ts is counted out, and when the second knocking present signal is considered to represent the valve seating noise.

It is assumed that the foregoing valve seating noise discriminating system is applied to an engine having a variable valve operating mechanism, and that the low engine speed operation mode is switched over to the high engine speed operation mode. In the latter mode, a cylinder, which is different from the cylinder associated with a first valve seating noise in the former mode, causes a second valve seating noise. The second valve seating noise is input into the valve seating noise discriminating unit before the valve seating noise detecting period Ts has been counted, and is considered to be knocking. As a result, the engine control system tends to erroneously retard the ignition timing when the high speed engine operation mode is switched over to the low speed engine operation mode or vice versa, which would lead to a reduced engine output.

It is an object of the invention to provide a valve seating noise discriminating unit, which can reliably prevent undesirable retardation of the ignition timing in response to the valve seating noise in an engine having a variable valve operating mechanism.

SUMMARY OF THE INVENTION

According to the invention, there is provided a valve seating noise discriminating system for an engine with a variable valve operating system comprises: a variable valve operation control unit for activating or de-activating at least either intake or exhaust valves of an engine having a plurality of cylinders according to a selected one of a plurality of valve operating modes; a knocking sensor for detecting vibrations equivalent to possible knocking during each combustion stroke in each cylinder and for producing a first knocking present signal; a valve seating noise discriminating unit for discriminating vibrations detected by the knocking sensor to be a valve seating noise caused by activation or de-activation of at least either the intake or exhaust valves when a level of the first knocking present signal output by the knocking sensor satisfies predetermined conditions; a cylinder number storage for storing the number of a cylinder associated with the first knocking present signal when the valve seating nose discriminating unit discriminates the vibrations to be the valve seating noise while the cylinder number storage is in a predetermined standby state; a knocking determining unit for determining that another cylinder for which a second knocking present signal is issued by the knocking sensor actually undergoes knocking after the cylinder number storage has stored the cylinder number associated with the first knocking present signal and when the cylinder related to the second knocking present signal differs from the cylinder related to the first knocking present signal; an ignition timing calculating unit for correcting a target ignition timing, set on the basis of engine operating information, so as to retard it on the basis of the knocking present signal output from the knocking sensor when the knocking sensor actually detects knocking, and for providing the corrected target ignition timing to an igniter driving circuit of the engine; and a control unit for the valve seating noise discriminating means, the control means placing the cylinder number storage in a standby state when a current valve operating mode is changed by the variable valve operation control unit.

In the foregoing arrangement, the valve seating noise discriminating unit discriminates a valve seating noise causes vibrations when a first knocking present signal from the knocking detecting means meets predetermined requirement. In this state, the cylinder number associated with the first knocking present signal is stored by the cylinder number storage. Then, when a second knocking present signal is issued for another cylinder, the knocking determining unit checks whether the cylinders associated with the first and second knocking present signals are the same. If the first and second knocking present signals are issued for two different cylinders, the knocking determining unit determines that the cylinder associated with the second knocking present signal actually undergoes knocking. Thereafter, the ignition timing calculating unit retards the target ignition timing in response to the knocking present signal, which depends upon engine operating information, and provides the retarded target ignition timing to the ignition driving circuit. Further, when a valve operation mode is switched over, the cylinder number storage is reset so as to clear information stored therein, thereby storing a cylinder number associated with a next knocking present signal as a new cylinder. Therefore, it is possible to prevent erroneous determination of knocking even when a different cylinder causes a valve seating noise after the valve operation mode change.

The cylinder number storage may include a timer which starts counting after the cylinder number storage has stored the cylinder number associated with the first knocking present signal output by the knocking detecting means, and placing the cylinder number storage in the standby sate after lapse of a predetermined valve seating noise detecting period.

The cylinder number stored in the cylinder number storage is cleared after the lapse of the valve seating noise detecting period, so that the cylinder number storage is ready for storing a new cylinder number associated with a next knocking present signal. Thus, knocking can be reliably detected without being confused with valve seating noises.

The knocking determining unit determines that the cylinder associated with the second knocking present signal undergoes knocking even when the cylinder associated with the second knocking present signal is the same as the cylinder whose number has been stored by the cylinder number storing means but when the second knocking present signal does not meet predetermined requirements.

In this arrangement, knocking can be reliably determined by excluding a valve seating noise.

The knocking determining unit determines that the second knocking present signal indicates a valve seating noise when the second knocking present signal is issued for the cylinder which is associated with the first knocking present signal and the number of which has been stored by the cylinder number storage and when the second knocking present signal meets the predetermined requirements, so that the ignition timing calculating means does not correct the target ignition timing in response to the knocking present signal.

Thus, when the valve seating noise is detected, no correction of the ignition timing will be performed.

The valve seating noise discriminating system further includes a retard amount setting member for setting an amount to retard the ignition timing in response to the knocking present signal issued by the knocking sensor. The knocking determining unit may determine that detected vibrations corresponds to a valve seating noise when the retard amount set by the retard amount setting member is within a predetermined range.

In this case, discrimination between knocking and valve seating noises can be performed further accurately. When knocking is actually detected, the ignition timing can be retarded reliably.

The valve seating noise discriminating unit may determine that detected vibrations correspond to a valve seating noise when the retard amount set by the retard amount setting member is within a predetermined range. In this case, knocking can be determined reliably.

The ignition timing calculating unit can accurately correct the target ignition timing on the basis of the retard amount set by the retard amount setting member. Thus, the target ignition timing can be reliably corrected on the basis of the amount of retard obtained from the retard amount setting member.

The valve seating noise discriminating unit puts the cylinder number storing means in the standby state after lapse of a predetermined period of time when the variable valve operation control unit confirms change-over of the valve operating mode.

The predetermined period of time is set on the basis of a period for the variable valve operation control unit to completely change the valve operating mode.

Thus, the cylinder number storage can be reliably put in the standby state after lapse of the predetermined period following the completion of the valve operating mode.

The valve seating noise discriminating system further includes an engine speed sensor. The knocking determining unit confirms presence or absence of knocking when an engine speed detected by the engine speed sensor is within a predetermined speed range.

Thus, actual knocking can be more accurately detected also on the basis of the engine speed.

Further, the variable valve operation control unit controls the valves in a high engine speed mode when the engine speed detected by the engine speed sensor is above a predetermined value, and controls the valves in a low engine speed mode when the detected engine speed is below the predetermined value.

Therefore, selection of the valve operation mode can be performed on the basis of the engine speed.

DETAILED DESCRIPTION OF PREFERRED EMBODIMENT

Figure 1:
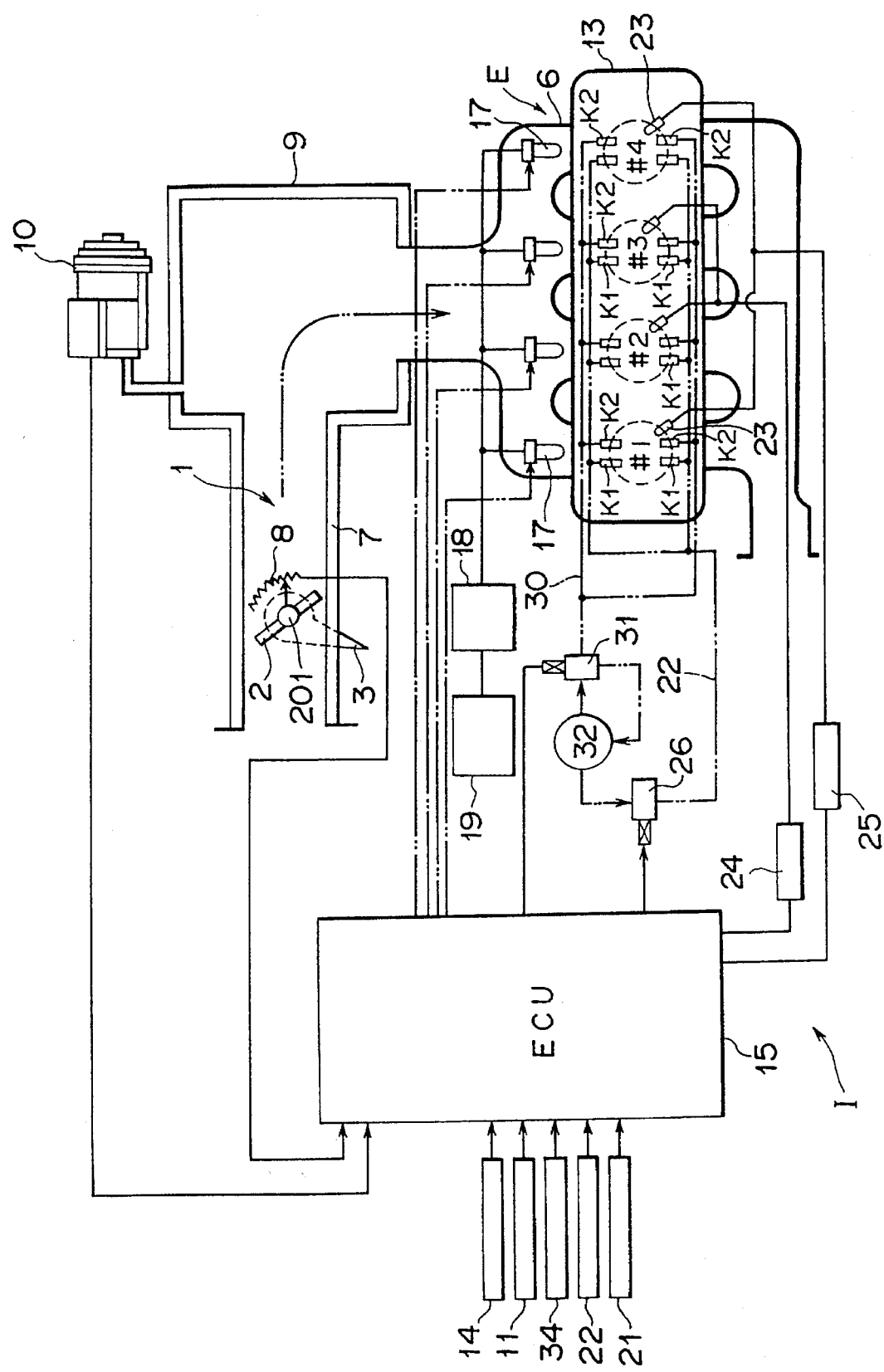
FIG. 1 is a schematic view showing an engine having a variable valve operating mechanism, to which a valve seating noise discriminating system of the invention is applied.

Referring to FIG. 1, a valve seating noise discriminating system of the invention is attached to an ignition timing control device I for an in-line four-cylinder engine E including a variable valve operating mechanism (hereinafter called "the engine E").

In the engine E, an intake air passage 1 includes an intake manifold 6, a surge tank 9 communicating with the intake manifold 6, an intake pipe 7 structured as one body with the surge tank 9, and an air cleaner (not shown). The intake pipe 7 rotatably supports a throttle valve 2 therein. The throttle valve 2 is coupled, via a shaft 201 thereof, to a throttle lever 3 outside the intake pipe 7.

The throttle lever 3 is coupled to an accelerator pedal (not shown), which turns the throttle lever 3 counterclockwise in the plane shown in FIG. 1. The throttle valve 2 is structured so as to be closed by a return spring not shown as an accelerator cable is slackened off. The throttle valve 2 has a throttle opening sensor 8, which provides an engine control unit (ECU) 15 (to be described later) with a throttle valve opening signal indicative of a throttle valve opening angle.

An intake air temperature sensor 14 is disposed in the intake air passage 1 so as to output intake air temperature information Ta. The engine E has a water temperature sensor 11 for detecting a temperature of cooling water as an engine warm-up temperature. In an engine crank shaft system not shown, a crank angle sensor 34 is disposed to output a unit crank pulse $\Delta\theta$ and a reference pulse $\theta_0$ of the engine E. Outputs of the crank angle sensor 34 are also used as engine speed information. A battery sensor 22 is provided for a battery not shown so as to detect a battery voltage VB. A knocking sensor 21 is disposed in a body of the engine E, and issues knocking present signals when vibrations corresponding to knocking in respective cylinders during the combustion stroke are detected. Levels of the knocking present signals are variable with vibration levels. The surge tank 9 has a negative pressure sensor 10 for outputting information on an intake pipe pressure Pb.

The engine E includes, on a cylinder head 13, a valve system for operating intake and exhaust valves of the respective cylinders. The engine E also includes an exhaust manifold and a muffler (not shown). Referring to FIG. 1, the valve system includes a variable valve operating mechanism, which opens and closes the intake and exhaust valves (not shown) in a low engine speed mode M-1 or a high engine speed mode M-2 by selectively activating low or high speed cams. The variable valve operating mechanism includes a low speed cam selecting unit K1 and a high speed cam selecting unit K2, both of which are of a hydraulic type. The low and high speed cam selecting units K1 and k2 are connected to rocker arms (not shown), and can stop the operation of the low or high speed cams whenever necessary. The units K1 and K2 have well-known structures, in which they engage or disengage rocker arms with or from rocker shafts by moving pins (not shown) via hydraulic cylinders, so that the high or low speed cams selectively come into contact with or are taken out of contact with the rocker arms.

A hydraulic circuit 22 supplies pressurized oil to the low speed cam selecting unit K1 via a first solenoid valve 26, while a hydraulic circuit 30 supplies pressurized oil to the high speed cam selecting unit K2 via a second solenoid valve 31. The first and second solenoid valves 26 and 31 are three-way valves, and are under the control of the engine control unit ECU 15. When the engine E is operating at a low speed by using the low speed cams in the mode M-1, both the first and second solenoid valves 26 and 31 are inactive. Conversely, during the high engine speed operation using the high speed cams in the mode M-2, both the valves 26 and 31 are active. Referring to FIG. 1, injectors 17 are located on the cylinder head 13, and inject fuel to the respective cylinders. A regulator 18 regulates fuel from a fuel tank 19, and supplies it to the injectors 17. The engine control unit ECU 15 controls fuel injection of the fuel injectors 17. Ignition plugs 23 are positioned on the cylinder head 13, and are provided for the respective cylinders. Specifically, the ignition plugs 23 for the cylinders #2 and #3 are interconnected and connected to an igniter 24 in an igniter driving circuit. The ignition plugs 23 for the cylinders #1 and #4 are interconnected and connected to an igniter 25. The igniters 24 and 25 are connected to the engine control unit ECU 15.

Figure 3:
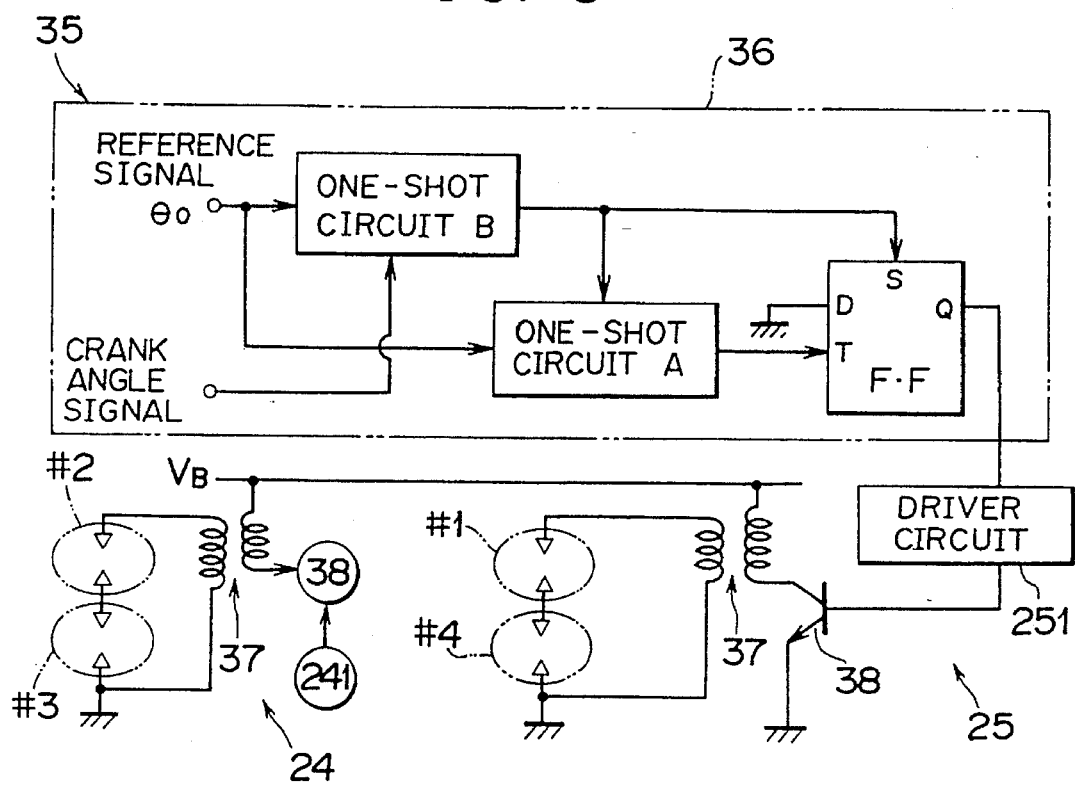
FIG. 3 is a block diagram of an igniter driving circuit to which the valve seating noise discriminating system is incorporated.

The igniter driving circuit includes a pair of timing control circuits 36 (only one timing control circuit 36 is shown in FIG. 3) and a pair of driver circuits 241 and 251 for the igniters 24 and 25. A pair of power transistors 38 for controlling timing to activate and de-activate the igniters 24 and 25 and an electric current conducting period are connected to the driver circuits 241 and 251, respectively. A pair of ignition coils 37 are connected to the power transistors 38.

The timing control circuits 36 serve for a group of the cylinders #1 and #4, and another group of the cylinders #2 and #3, respectively. The timing control circuits 36 operate in response to the reference signal 80 $\theta_0$ from the crank angle sensor 34 and the unit crank pulse signal $\Delta\theta$ (1° and 2° unit pulse). FIG. 3 shows the timing control circuit 36 for the cylinders #1 and #4 while the timing control circuit 36 for the cylinders #2 and #3 is omitted.

Figure 4:
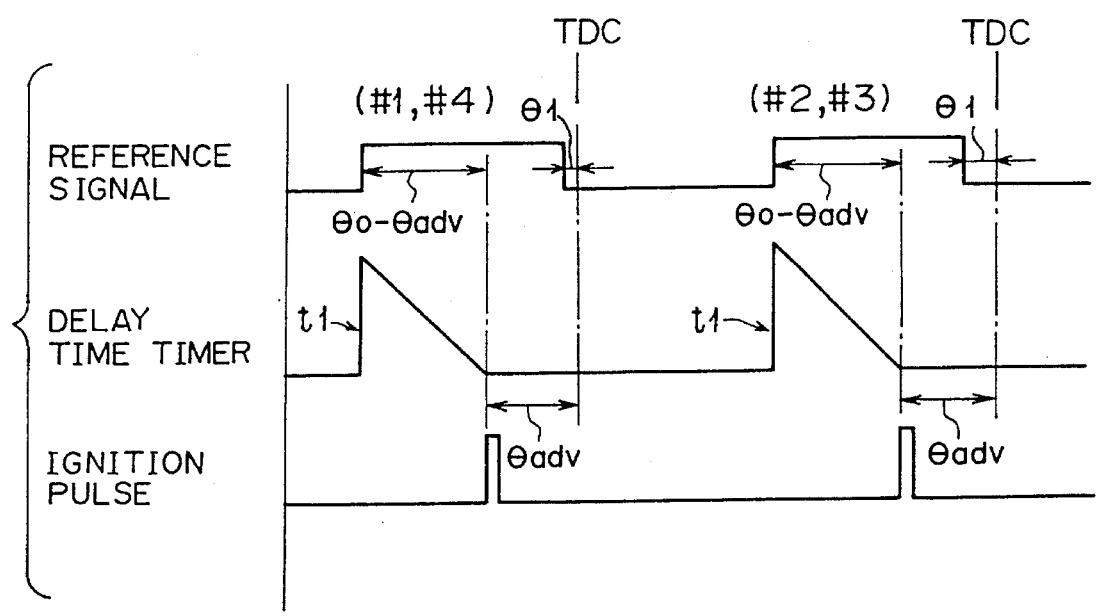
FIG. 4 is a timing chart showing operation sequences of the igniter driving circuit in an ignition timing control unit.

The reference signal 80 is output to a one-shot circuit B. When the engine in a steady operation, the one-shot circuit B is structured so that it is triggered by the reference signal $\theta_0$ which is issued before the top dead center (e.g. 75°) and that it outputs a signal for starting conduction of an electric current after a delay time t1. The delay time t1 corresponds to the predetermined number of the crank angle signals (1° or 2° unit crank pulses), i.e. reference signal $\theta_0$—target ignition time $\theta_{adv}$). Refer to FIG. 4. In this case, the target ignition timing $\theta_{adv}$ is calculated in step s7 of the ignition control routine shown in FIG. 9 as will be described later.

The one-shot circuit A is triggered by the electric current conducting signal, and is configured so that it outputs an ignition signal after counting the predetermined number of crank pulse signals corresponding to a dwell angle $\psi$. A flip-flop F.F is set in response to the electric current conducting signal from the one-shot circuit B, and is reset by the ignition signal from the one-shot circuit A. The driver circuit 251 activates the power transistors 38 only while the flip-flop F.F is being set, thereby introducing an electric current to the ignition coils 37. When the power transistors 38 are de-activated, the ignition coils 37 generate a high voltage current at secondary sides thereof, which is supplied to the ignition plugs 23 for the cylinders #1 and #4. Thus, the cylinders #1 and #4 will be ignited.

The timing control circuit (not shown) for the cylinders #2 and #3 is structured identically to the timing control circuit for the cylinders #1 and #4. In response to the operation of the driver circuit 241 and the power transistors 38, a high voltage current is supplied, at the target ignition timing $\theta_{adv}$, from the secondary sides of the ignition coils 37 to the ignition plugs 23 for the cylinders #2 and #3 which are continuously active. The #1/#4 cylinder group and the #2/#3 cylinder group are alternatively ignited at each crank angle of 180°.

The engine control unit ECU 15 is mainly a microcomputer, and not only performs well-known control functions such as controlling a quantity of fuel to be injected but also carries out sub-routine operations by interrupting its main routine at predetermined crank angles so as to discriminate the valve seating noise and control the ignition timing. The engine control unit ECU 15 functions as separate units as shown in FIG. 2.

Figure 2:
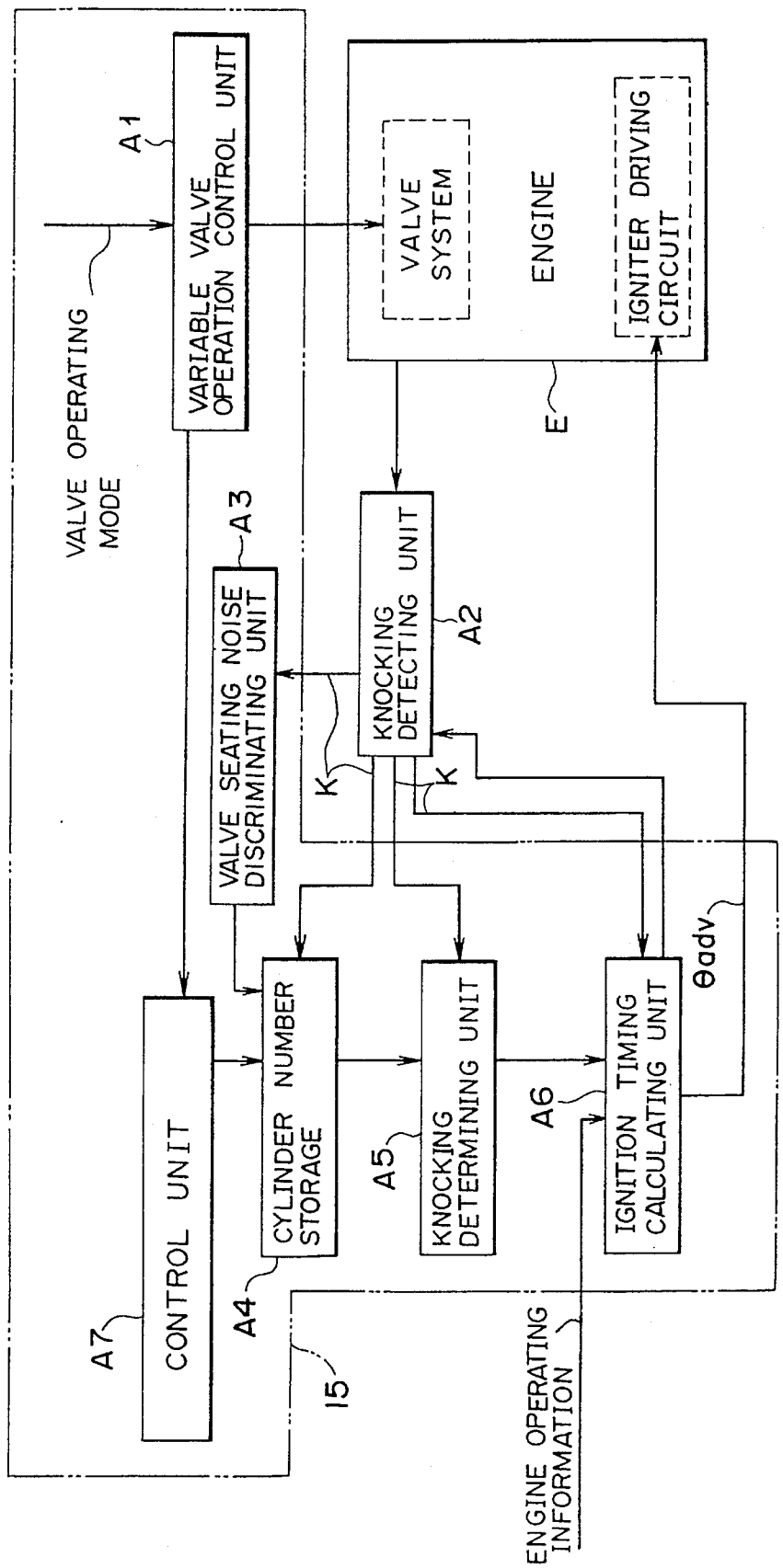
FIG. 2 is a block diagram showing functional blocks of the valve seating noise discriminating system of FIG. 1.

Referring to FIG. 2, the engine control unit ECU 15 functions as a variable valve operation control unit A1, a knocking sensor A2, a valve seating noise discriminating unit A3, a cylinder number storage A4, a knocking confirming unit A5, an ignition timing calculator A6, and a controller A7 for the valve seating noise discriminating unit.

The variable valve operation control unit A1 selectively controls opening and closing of at least either intake or exhaust valves, of the engine E having a plurality of cylinders, according to a selected one of the predetermined valve operation modes.

The knocking sensor A2 detects vibrations equivalent to knocking generated during each combustion stroke of the cylinders, and outputs a knocking present signal K.

The valve seating noise confirming unit A3 confirms that vibrations detected by the knocking sensor A2 denote valve seating noises caused by the closing or opening of at least either the intake or exhaust valves when a first knocking present signal K output from the knocking sensor A2 satisfies predetermined requirements. The cylinder number storage A4 stores a cylinder number for which the knocking present signal K is issued when the valve seating noise confirming unit A3 identifies the vibrations to be a valve seating noise while the cylinder number storage A4 is on standby. The knocking sensor A2 sends a second knocking present signal K after the cylinder number storage A4 has stored the cylinder number associated with the first knocking signal K. When the second knocking signal K is issued for a cylinder different from the cylinder whose number has been stored in the cylinder number storage A4, the knocking confirming unit A5 confirms that the cylinder associated with the second knocking signal K undergoes knocking. Thereafter, the ignition timing calculator A6 retards the target ignition timing $\theta_{adv}$, which has been determined on the basis of the operational information of the Engine E, in response to the knocking present signal K from the knocking sensor A2, and outputs the retarded target ignition timing to the igniter driving circuits of the engine E. After confirming that the valve operation mode has been changed by the variable valve operation control unit A1, the controller A7 returns the cylinder number storage A4 to the standby state.

Figure 6:
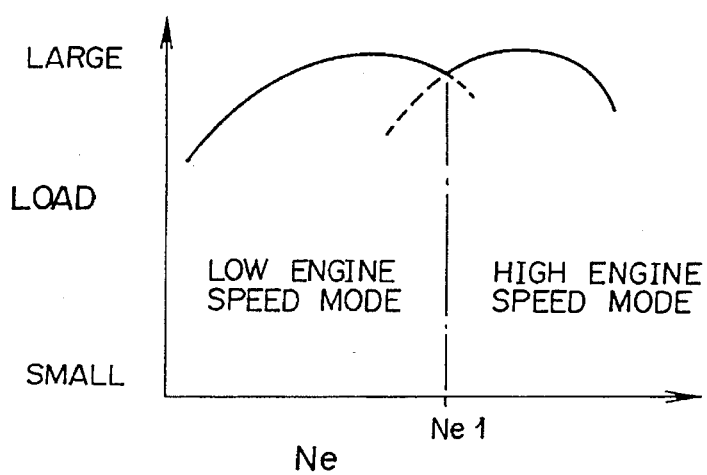
FIG. 6 is a map showing the change-over between a high engine speed mode and a low engine speed mode.

The operation of the valve seating noise discriminating system applied to the engine having the variable valve operating mechanism will be described with reference to FIGS. 7 to 10. The actuation of a main switch, not shown, starts a logic flow, according to which the engine control unit ECU 15 performs its control operations in the main routine. In step q1, the engine control unit ECU 15 checks various functions thereof, performs initialization, and goes to step q2. In step q2, the engine control unit ECU 15 reads various pieces of engine operating information, and then goes to step q3, wherein the engine control unit ECU 15 selects either a high or low engine speed mode on the basis of the engine operating information. Specifically, referring to FIG. 6, either the low or high engine speed mode is selected depending upon whether a current engine speed Ne is below or above a predetermined engine speed Ne1. Alternatively, either the low or high engine speed mode may be selected as a target engine operation mode on the basis of engine operating information such as a cooling water temperature Twt indicative of an engine warm-up state, and load information on the basis of an engine speed Ne and an intake pipe pressure Pb. Either a low or high speed solenoid valve 26 or 31 is actuated or deactuated according to the selected target operation mode.

Figure 5:
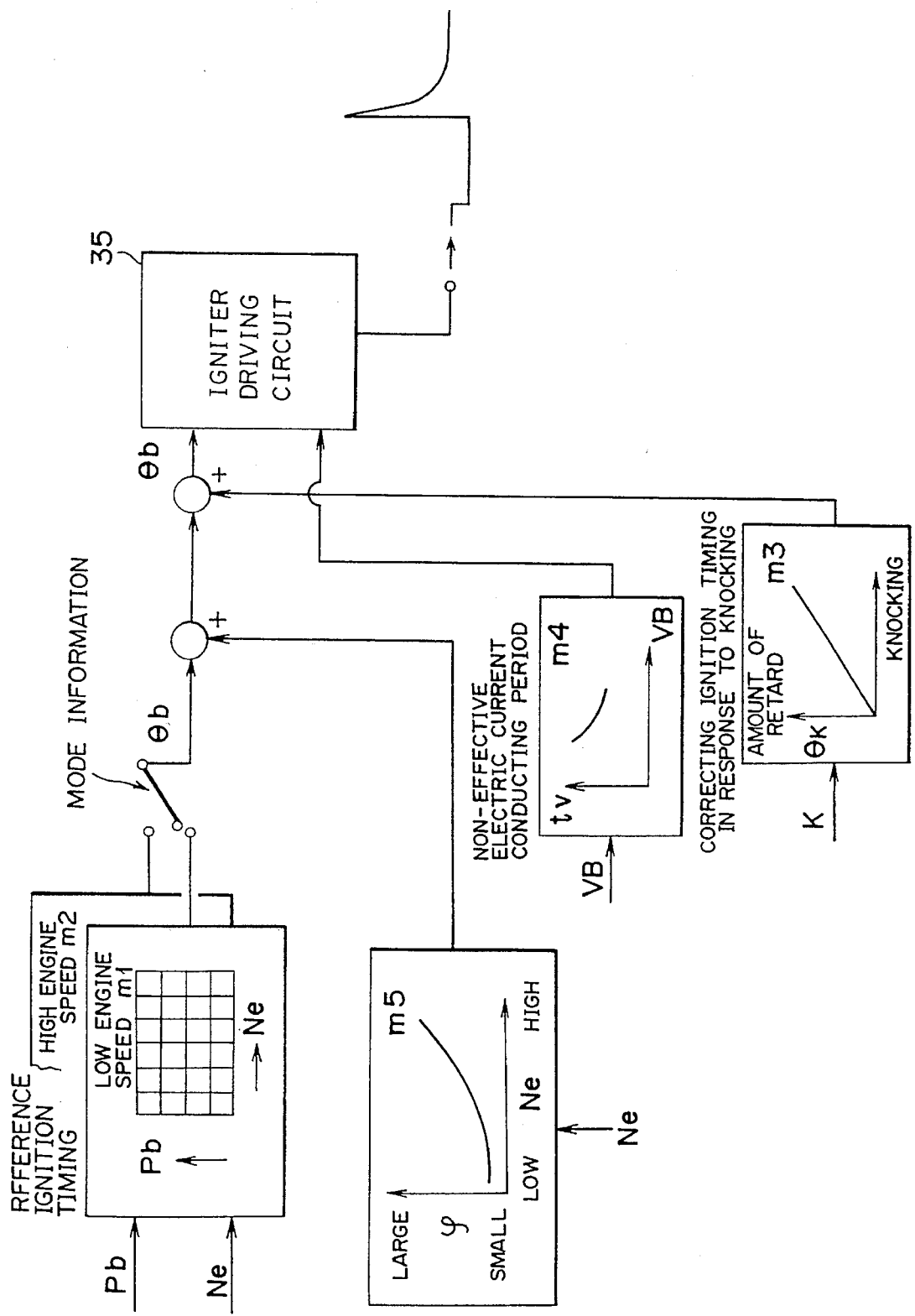
FIG. 5 is a block diagram of an ignition timing control device of the engine shown in FIG. 1.

In step q4 of the main routine, the engine control unit ECU 15 controls the ignition timing. Specifically, reference ignition timing $\theta_b$ is calculated for either the low or high engine speed mode according to the engine speed Ne (in the engine operating information) and the intake pipe pressure Pb (as the load information). As shown in FIG. 5, the engine control unit ECU 15 receives information on low and high engine speed modes, selects either a reference ignition timing calculating map m1 or m2 according to the selected operation mode, and calculates the reference ignition timing $\theta_b$ associated with the current engine speed Ne and the intake pipe pressure Pb. Further, the engine control unit ECU 15 derives a non-effective electric current conducting period tv by using a map m4, and also derives a dwell angle $\psi$ by using a dowel angle calculating map m5. The non-effective electric current conducting period tv depends upon a battery voltage VB, and the dwell angle $\psi$ depends upon the engine speed Ne. In steps q5 and q6, the engine control unit ECU 15 controls operations of the injectors and the engine in a well-known manner, and returns to step q2.

Figure 9:
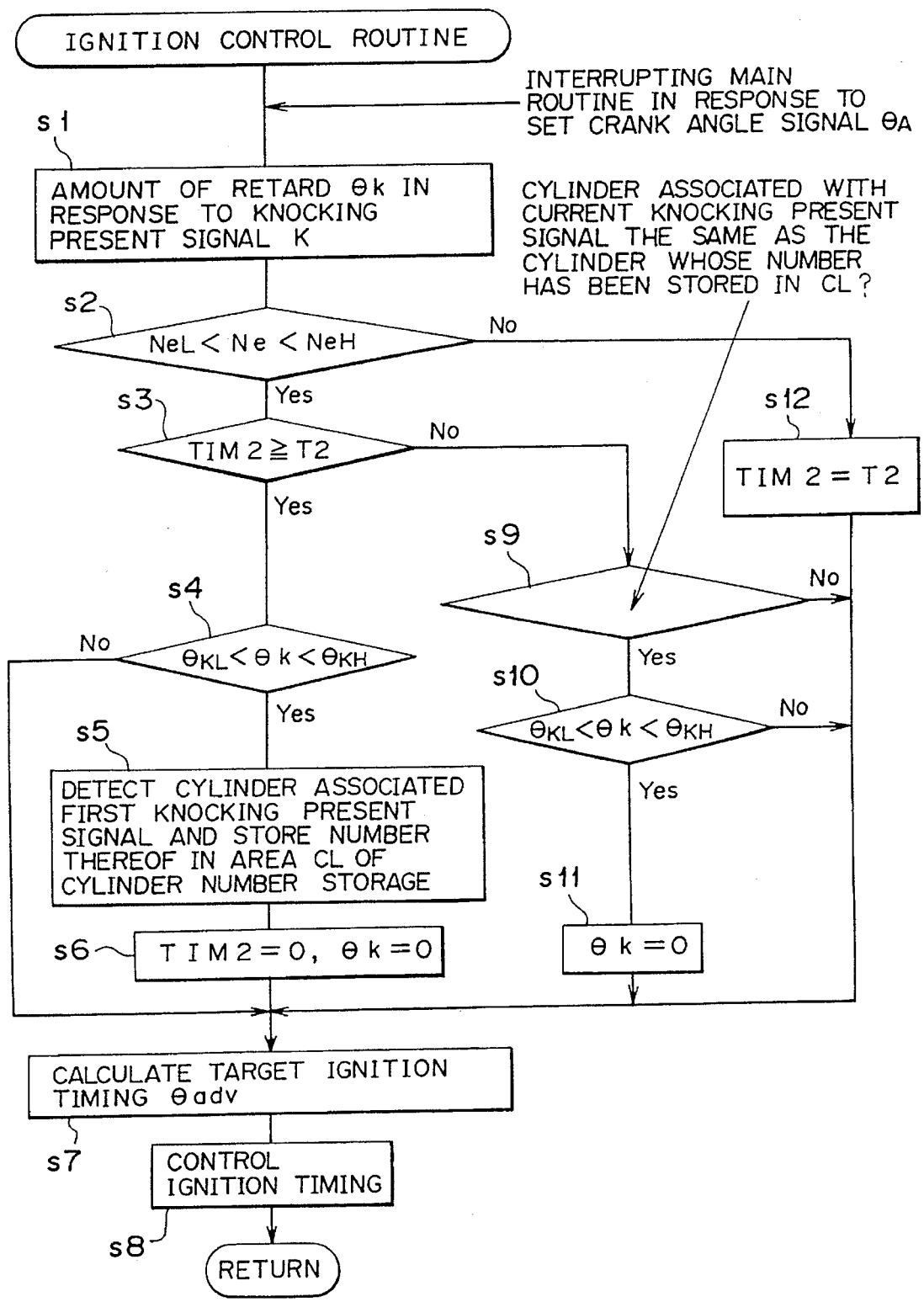
FIG. 9 is a flowchart of an ignition control routine of the valve seating noise discriminating system of FIG. 1.
Figure 10:
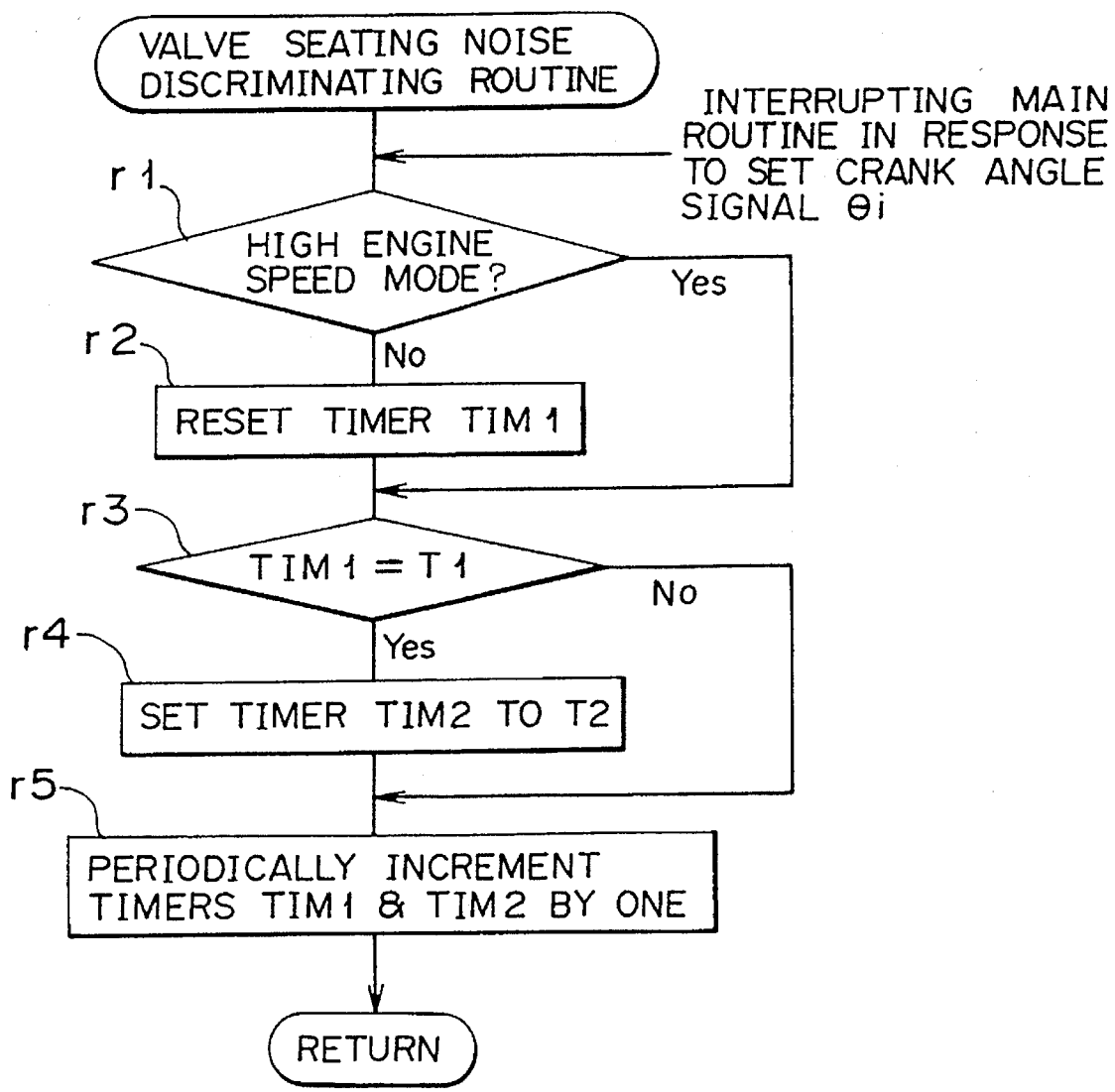
FIG. 10 is a flowchart of a valve seating noise discriminating routine of the valve seating noise discriminating system.

Referring to FIG. 9, an ignition control routine is performed by interrupting the main routine each time a predetermined crank angle signal $\theta_a$ is received. Further, referring to FIG. 10, a valve seating noise discriminating routine is performed by interrupting the main routine each time another predetermined crank angle signal $\theta_c$ is received.

In the valve seating noise discriminating routine, the following processes are carried out before the low engine speed mode is changed over to the high engine speed mode.

In step r1, determination is made as to whether or not the high engine speed mode is in progress. When the high engine speed mode is not in progress, the logic flow proceeds to step r2. In step r2, a timer TIM1 for counting a mode change-over period T1 is reset (refer to "t1" shown in FIG. 7). The mode change-over period T1 is provided by assuming a period of time which is required to de-activate the low speed cam selecting mechanism K1 and activate the high speed cam selecting mechanism K2 so as to make the valve system ready for the high engine speed mode. The processing in step r2 is carried out in the low engine speed mode until the high engine speed mode is established. Then, the logic flow proceeds to step r3. Thereafter, the timer TIM1 starts counting. In step r3, it is assumed that the mode change-over period T1 set in the timer TIM1 is determined to be zero. Then, logic flow goes to step r5, wherein the timer TIM1 and the timer TIM2 (i.e. timer TIM2 is for counting the valve seating noise detecting period T2 which has been set in response to the input of the knocking present signal K (refer to FIG. 7)) are incremented by one. Then, logic flow returns to the main routine.

Figure 7:
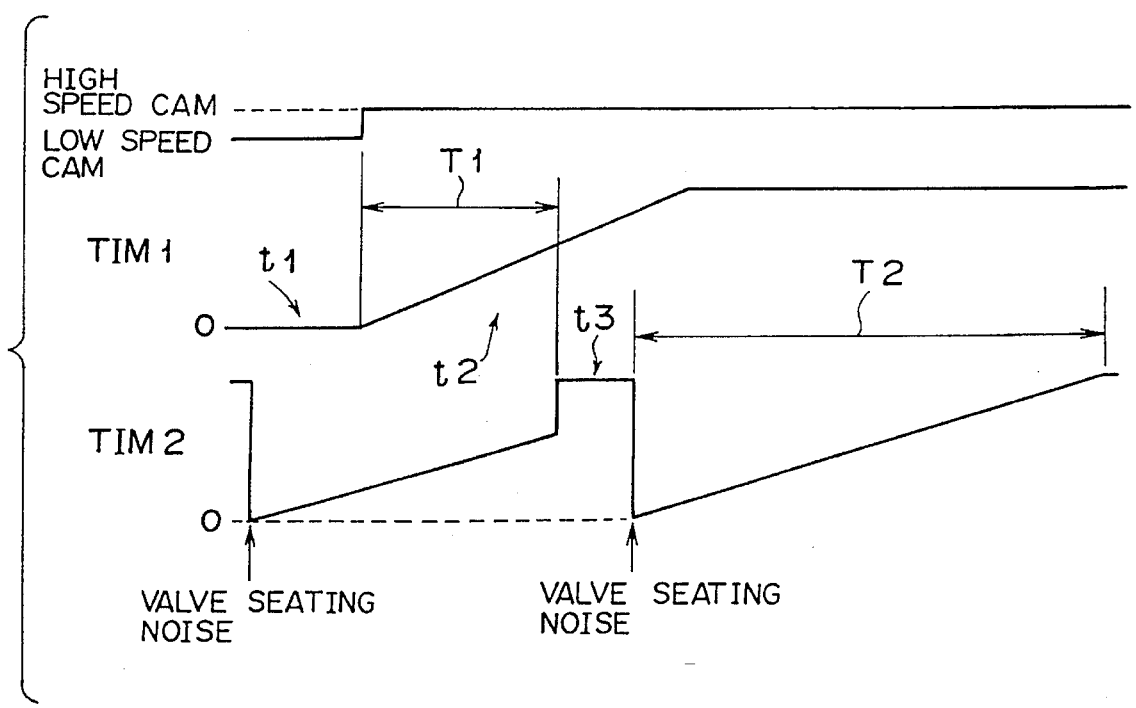
FIG. 7 is a timing chart showing the operation sequence of timers at the time of change-over between the high and low engine speed modes.
Figure 8:
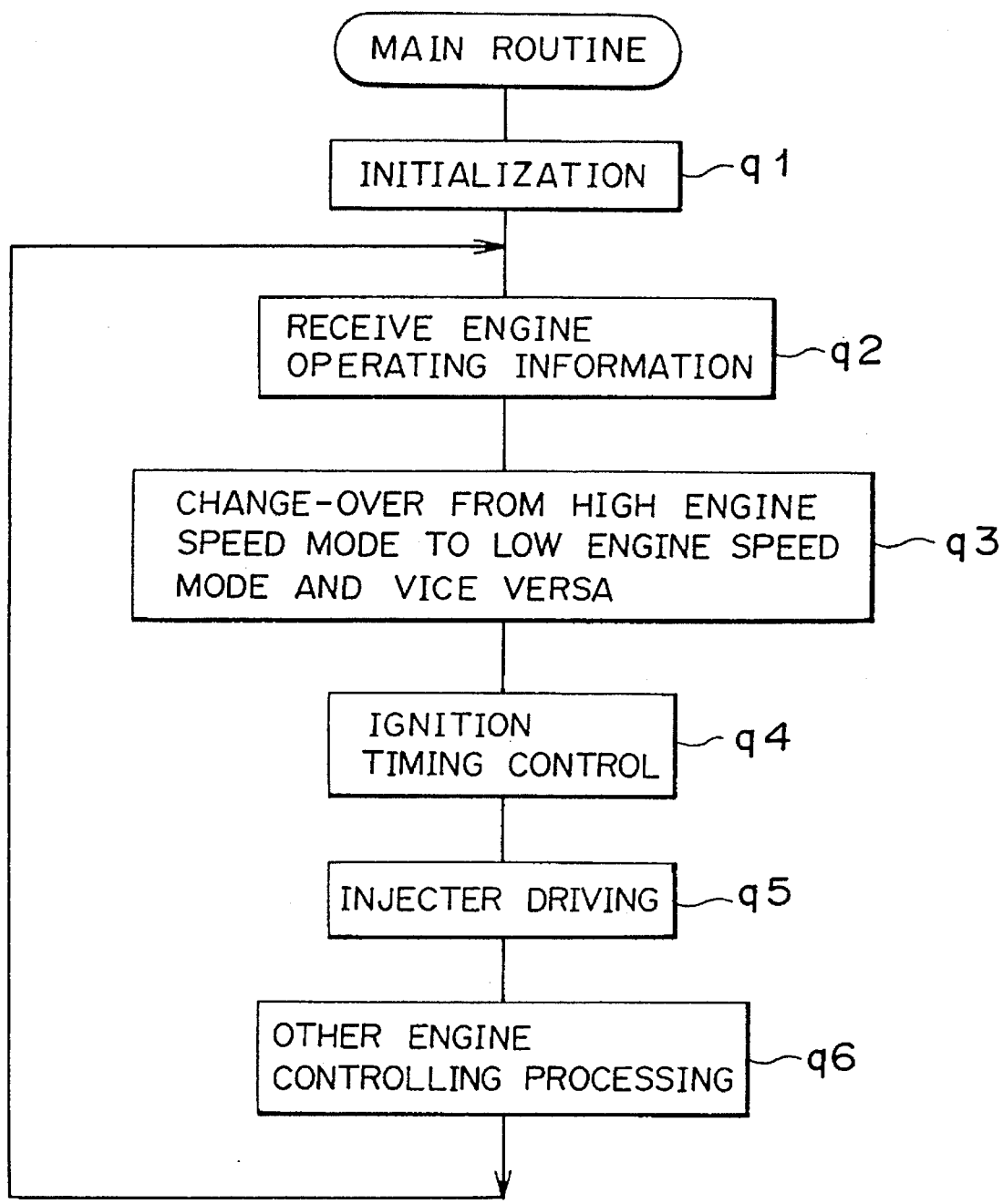
FIG. 8 is a flowchart of a main routine of the valve seating noise discriminating system of FIG. 1.

When the low engine speed mode is actually switched-over to the high engine speed mode, the engine control unit ECU 15 repeatedly advances to steps r3 and r5 from step r1 (refer to "t2" shown in FIG. 7). Therefore, the timer TIM1 continues to count the mode change-over period T1. When the timer TIM1 counts out the period T1 in step r3, logic flow proceeds to steps r4 and r5. The valve seating noise detecting period T2 is set in the timer TIM2 to return the timer TIM2 to the standby state (refer to "t3" shown in FIG. 7) until a next first knocking present signal K (for a first valve seating noise) is input.

Thereafter, when a knocking present signal K is generated for another cylinder, the engine control unit ECU 15 resets the timer TIM2 in step s6 of the ignition control routine (shown in FIG. 9) as will be described later. Then, in step r5, the engine control unit ECU 15 increments the timers TIM1 and TIM2 by one, respectively, and returns to the main routine. In other words, at the time of change-over from the low engine speed mode to the high engine speed mode, the timer TIM2 is again put on standby. Thereafter, when a knocking present signal K is input, the cylinder associated with this knocking present signal K is determined to be causing a valve seating noise. Then, the timer TIM2 is reset, and starts counting.

The ignition processing routine is executed each time the preset crank angle signal $\theta_a$ arrives.

When advancing to step s1 (FIG. 9), the engine control unit ECU 15 checks data as to whether or not a knocking present signal K has arrived up to the current moment after the previous cycle. When the knocking present signal K has been input, the engine control unit ECU 15 calculates an amount of retard $\theta_k$ on the basis of the level of the knocking present signal K with reference to the retard angle calculating map m3.

In step s2, the engine speed at which valve seating noise discriminating logic is operated is limited in a range between predetermined low and high engine speed limits NeL and NeH. When the engine speed Ne is within the foregoing range, the engine control unit ECU 15 goes to step s3. Conversely, when the engine speed Ne is outside the foregoing range, logic flow advances to step s12. In step s12, the timer TIM2 is put on standby, i.e. the valve seating noise detecting period T2 is set in the timer TIM2. Logic flow proceeds to step s7. Therefore, when the engine speed deviates from the foregoing range, no detection of valve seating noises is performed, but the ignition timing is retarded simply in response to the knocking present signal.

When a first knocking present signal K is input after the timer TIM2 is returned to the standby state, logic flow goes to steps s3 and s4 from step s2. In step s4, it is checked whether the angle of retard $\theta_k$ (based on the knocking present signal K) corresponds to the range of the valve seating noise levels (between low and high limits $\theta_{KL}$ and $\theta_{KH}$), i.e. $\theta_{KL} < \theta_K < \theta_{KH}$. When $\theta_k$ is in the foregoing range, logic flow advances to step s5. In step s5, a cylinder associated with the first knocking present signal K is detected. The number of the cylinder in question is stored in a memory area CL of the cylinder number storage. In step s6, the timer TIM2 is reset to start counting. Then, the angle of retard $\theta_K$ is corrected to zero. In other words, the current knocking signal K is recognized to be issued for a first valve seating noise, and logic flow advances to step s7.

When the level of the knocking present signal K deviates from the valve seating noise level, the knocking present signal is considered to represent actual knocking, and logic flow directly goes to step s7.

In step s7, target ignition timing $\theta_{adv}$ ($=\theta_b-\theta_k-tv$) is calculated on the basis of the angle of retard $\theta_k$ obtained in steps s1 and s6, the reference ignition timing $\theta_b$ obtained in the main routine, and the non-effective electric current conducting period tv according to the battery voltage VB. Then, in step s8, the target ignition timing $\theta_{adv}$ and the dwell angle $\psi$ are set in the timing control circuit 35. Then, logic flow returns to the main routine. Thereafter, the timing control circuit 35, driver circuits 251 and 241, igniters 24 and 25, and so on operate to ignite the two groups of cylinders #1 and #4, and #2 and #3 at the proper timing.

On the other hand, before the timer TIM2 counts out the valve seating noise detecting period T2 in step s3, logic flow proceeds to step s9. In step s9, the engine control unit ECU 15 checks whether or not the second knocking present signal K is generated for the cylinder whose number has been stored in the area CL in association with the first knocking present signal K. When the second knocking present signal K is generated for the same cylinder, logic flow proceeds to step s10. In step s10, determination is made as to whether or not the current angle of retard $\theta_K$ corresponds to the valve seating noise level range (between low and high limits $\theta_{KL}$ and $\theta_{KH}$), i.e. $\theta_{KL} < \theta_K < \theta_{KH}$. When $\theta_{KL} < \theta_K < \theta_{KH}$, $\theta_K$ is corrected to zero in step s11. Then, logic flow proceeds to step s7. Conversely, when the second knocking present signal K is generated for the cylinder different from the cylinder for which the first knocking present signal K was generated, or when the angle of retard $\theta_K$ does not correspond to the range of the valve seating noise level, it is confirmed that actual knocking is present. Then, logic flow proceeds to step s7, where target ignition timing $\theta_{adv}$ is calculated so as to retard the ignition timing.

As described so far, when the low engine speed mode is not changed over to the high engine speed mode, and when the knocking present signals K whose levels are within the range of the valve seating noise level are generated twice for the same cylinder, these knocking present signals are discriminated from a knocking present signal whose level deviates from the valve seating noise level. In other words, the knocking present signals K are considered to represent the valve seating noise, so that the ignition timing retarding process for the knocking is canceled. Further, when the low engine speed mode is being switched over to the high engine speed mode, the timer TIM2 is returned to the standby state after the timer TIM1 counts out the mode change-over period, i.e. after the valve system completes change-over of the high speed cams. When the first and second knocking present signals K are generated for the same cylinder within the valve seating noise detecting period T2, it is determined that a valve seating noise is present, so that the ignition timing retarding process for the knocking will be canceled.

Even when the timer TIM2 continues counting while the low or high speed cams are being changed over in the valve system, the timer TIM2 is reset to be put on the standby. Therefore, it is possible to discriminate the valve seating noises from the knocking during the change-over of the low and high speed cams in the valve system, thereby preventing a problem in which the ignition timing might be retarded due to the valve seating noises.

In this embodiment, the valve seating noise is detected based on Whether the amount of retard $\theta_K$ corresponding to the level of the knocking present signal K corresponds to the valve seating noise level range. Alternatively, it is possible to discriminate the valve seating noise depending upon whether the level of the knocking present signal K is within the predetermined level.

According to the invention, when the knocking present signal K is input and when the predetermined conditions are satisfied, vibrations occurring in this state are determined to be valve seating noises. The cylinder number associated with the knocking present signal is stored. When a cylinder for which another knocking present signal is generated is identified, determination is made as to whether the cylinder associated with the first signal coincides with the cylinder associated with the second signal. If these cylinders are different, the cylinder associated with the second knocking present signal is determined to be undergoing actual knocking. Then, target ignition timing, which is determined according to operational information of the engine, is retarded in response to the knocking present signal K, so that a corrected target ignition timing $\theta_{adv}$ is output to the igniter driving circuit of the engine. Specifically, since the cylinder number storage is put on standby when the valve operating mode is changed, the cylinder number which has been stored is cleared. Thus, a cylinder corresponding to a next knocking present signal is stored as a new cylinder, so that it is possible to prevent erroneous determination of knocking when a different cylinder causes a valve seating noise after the low engine speed mode is changed over to the high engine speed mode.

Industrial Applicability

The valve seating noise discriminating system according to the invention is applicable to an engine, in which a valve system can selectively change operation statuses of intake and exhaust valves to establish either the partial or full cylinder operation mode. Further, the valve seating noise discriminating system permits valve seating noises to be discriminated from vibrations caused by knocking, permits effective retardation of the target ignition timing in response to the knocking, and assures long and reliable operation of the engine under a variety of operating conditions.

What is claimed is:

1. A valve seating noise discriminating system for an engine with a variable valve operating system, comprising:

variable valve operation control means for controlling operation states of at least either intake or exhaust valves of an engine having a plurality of cylinders according to a selected one of a plurality of valve operating modes;

knocking detecting means for detecting vibrations equivalent to possible knocking during each combustion stroke in each cylinder and for producing a knocking present signal;

valve seating noise discriminating means for discriminating vibrations detected by the knocking detecting means to be a valve seating noise caused by opening or closing of at least either the intake or exhaust valves when a level of a first knocking present signal output by the knocking detecting means satisfies predetermined conditions;

cylinder number storing means for storing the number of a cylinder associated with the first knocking present signal when the valve seating noise discriminating means discriminates the vibrations to be the valve seating noise while the cylinder number storing means is in a predetermined standby state;

knocking determining means for determining that another cylinder for which a second knocking present signal is issued by the knocking detecting means actually undergoes knocking after the cylinder number storing means has stored the cylinder number associated with the first knocking present signal and when the cylinder related to the second knocking present signal differs from the cylinder related to the first knocking present signal;

ignition timing calculating means for correcting a target ignition timing, set on the basis of engine operating information, so as to retard it on the basis of the knocking present signal output from the knocking detecting means when the knocking detecting means actually detects knocking, and for providing the corrected target ignition timing to an igniter driving circuit of the engine; and control means for putting the cylinder number storing means in the standby state when a current valve operating mode is changed by the variable valve operation control means.

2. A valve seating noise discriminating system as in claim 1, wherein the cylinder number storing means includes a timer which starts counting after the cylinder number storing means has stored the cylinder number associated with the first knocking present signal output by the knocking detecting means, and placing the cylinder number storing means in the standby state after the lapse of a predetermined valve seating noise detecting period.

3. A valve seating noise discriminating system as in claim 1, wherein the knocking detecting means determines that the cylinder associated with the second knocking present signal undergoes knocking even when the cylinder associated with the second knocking present signal is the same as the cylinder whose number has been stored by the cylinder number storing means but when the second knocking present signal does not meet predetermined requirements.

4. A valve seating noise discriminating system as in claim 3, wherein the knocking determining means determines that the second knocking present signal indicates a valve seating noise when the second knocking present signal is issued for the cylinder which is associated with the first knocking present signal, the number of which has been stored by the cylinder number storing means, and when the second knocking present signal meets the predetermined requirements, so that the ignition timing calculating means does not correct the target ignition timing in response to the knocking present signal.

5. A valve seating noise discriminating system as in claim 3, further including retard amount setting means for setting an amount by which to retard the ignition timing in response to the knocking present signal issued by the knocking detecting means, and wherein the knocking detecting means determines that detected vibrations corresponds to a valve seating noise when the retard amount set by the retard amount setting means is within a predetermined range.

6. A valve seating noise discriminating system as in claim 1, further including retard amount setting means for setting an amount by which to retard the ignition timing in response to the knocking present signal issued by the knocking detecting means, and wherein the valve seating noise discriminating means determines that detected vibrations correspond to a valve seating noise when the retard amount set by the retard amount setting means is within a predetermined range.

7. A valve seating noise discriminating system as in claim 6, wherein the ignition timing calculating means corrects the target ignition timing on the basis of the retard amount set by the retard amount setting means.

8. A valve seating noise discriminating system as in claim 1, wherein the valve seating noise discriminating means puts the cylinder number storing means in the standby state after the lapse of a predetermined period of time after the variable valve operation control means confirms change-over of the valve operating mode.

9. A valve seating noise discriminating system as in claim 8, wherein the predetermined period of time is set on the basis of a period required for the variable valve operation control means to completely change the valve operating mode.

10. A valve seating noise discriminating system as in claim 1, further including engine speed detecting means, and wherein the knocking determining means confirms presence or absence of actual knocking when an engine speed detected by the engine speed detecting means is within a predetermined speed range.

11. A valve seating noise discriminating system as in claim 1, further including engine speed detecting means, and wherein the variable valve operation control means controls the valves in a high engine speed mode when the engine speed detected by the engine speed detecting means is above a predetermined value, and controls the valves in a low engine speed mode when the detected engine speed is below the predetermined value.

\* \* \* \* \*